No. 890,810. PATENTED JUNE 16, 1908.
H. R. STACKS.
FRICTION CLUTCH.
APPLICATION FILED MAR. 30, 1908.
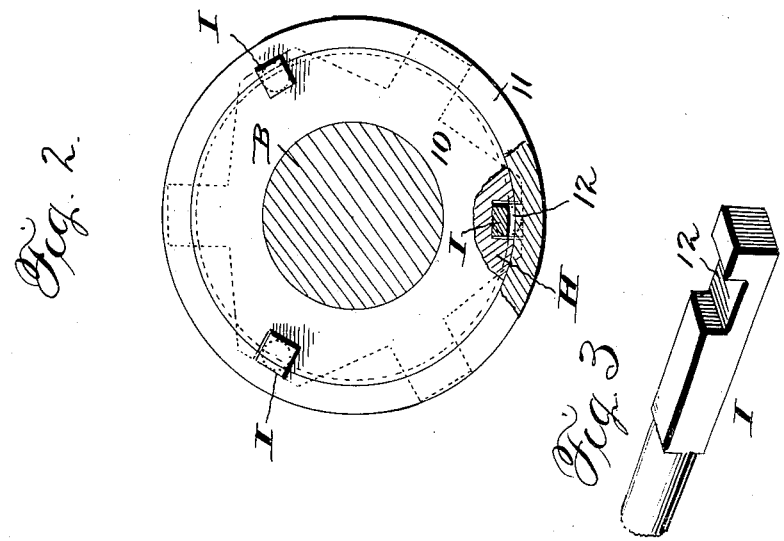
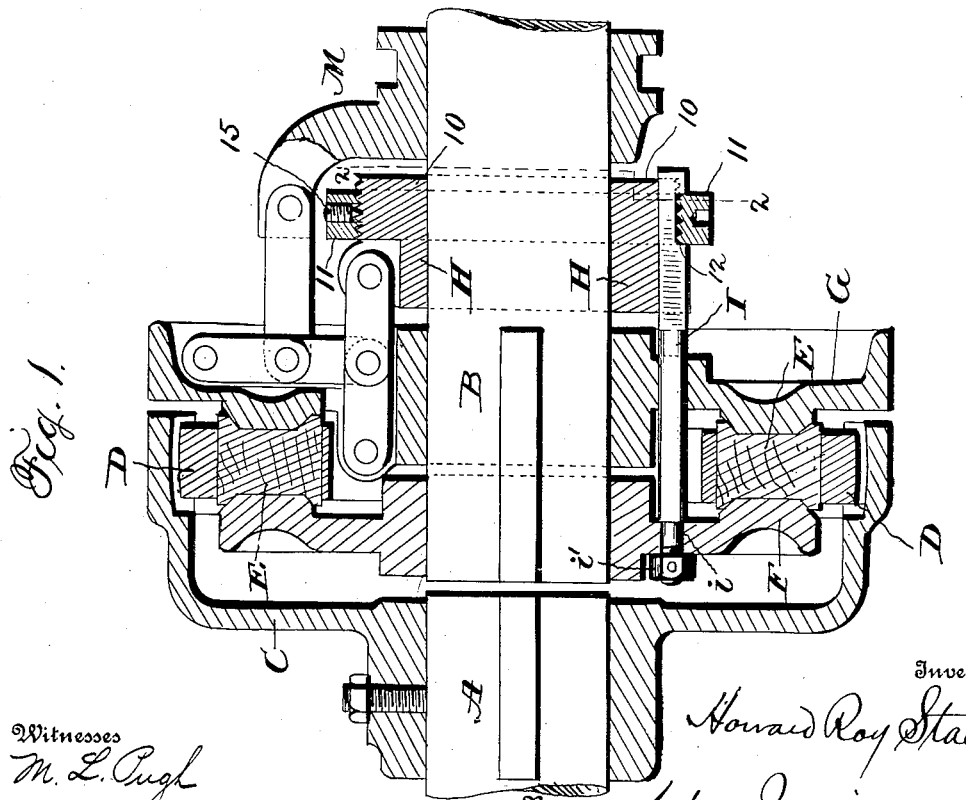
Witnesses
M. L. Pugh
J. Raymond Hoover
Inventor
Howard Roy Stacks
By Chas. J. Williamson,
Attorney

UNITED STATES PATENT OFFICE.

HOWARD ROY STACKS, OF PHILADELPHIA, PENNSYLVANIA, ASSIGNOR TO GEO. V. CRESSON CO., OF PHILADELPHIA, PENNSYLVANIA.

FRICTION-CLUTCH.

No. 890,810.     Specification of Letters Patent.     Patented June 16, 1908.

Application filed March 30, 1908. Serial No. 424,193.

*To all whom it may concern:*

Be it known that I, HOWARD ROY STACKS, a citizen of the United States, residing at Philadelphia, in the county of Philadelphia and State of Pennsylvania, have invented a certain new and useful Improvement in Friction-Clutches, and do hereby declare that the following is a full, clear, and exact description thereof.

Reference being had to the accompanying drawings, Figure 1 is a longitudinal section of a clutch embodying my invention; Fig. 2 a cross section on the line 2—2 of Fig. 1; and Fig. 3 a detail perspective view of one of the adjusting bolts.

The object of my invention is to improve the type of clutch which forms the subject of Patent No. 835,373, issued Nov. 6, 1906, to George V. Cresson Co. as my assignee. In such clutches a collar is employed, through which power is applied to the clamping rings, and several bolts or screws connect the collar and one of the clamping rings, the bolts or screws extending parallel with the axis of revolution of the clutch, and in adjusting the clutch, it is necessary to manipulate each bolt or screw independently of the other, and skilled labor is necessary for the accurate adjustment of the bolts or screws to get proper work out of the clutch. As these clutches often go to plants where no mechanic is available, they will be adjusted by an ordinary or unskilled laborer, and it invariably happens that the bolts or screws will not be equally or uniformly adjusted, and the result is that the clutch does not operate satisfactorily because of the uneven engagement or contact of the clamping surfaces. Another difficulty that is encountered, is the inability to keep the clamping nuts on the bolts tight or fixed under the inevitable jar or vibration incident to the revolution of the clutch, and of course any loosening of said nuts destroys the adjustment of the clutch, and causes trouble.

By the improvements which form the subject of this patent, I completely obviate the objections I have mentioned, as well as render the clutch more desirable for other reasons.

The clutch which I have chosen to illustrate my improvements, is similar to the clutch shown in Fig. 1 of the patent before mentioned, and like the latter is shown applied to two shaft sections A and B to one of which sections is attached a cup-form shell C within which is a ring D that is connected with the shell so that the two will rotate together, which ring D is provided with a series of wooden friction blocks E adapted to be engaged by ribs or projections on clamping rings or jaws F and G on opposite sides of the friction ring D, said clamping rings or jaws F and G being slidably keyed to the shaft section B, to which clamping rings or jaws are connected a collar H that encircles the shaft section B, the connection between the collar H and the clamping ring or jaw G, and with the usual operating collar M, being by means of an arrangement of toggle levers, not necessary to be described herein, and the connection between said collar H and the clamping ring F consisting of a series of rods or bolts I. Each bolt I is rigidly connected at one end to the clamping ring or jaw F, by means of a shoulder $i$ that engages one side of the ring or jaw, and a nut $i'$ that engages the opposite side of the clamping jaw, and is preferably pinned to the bolt. For a portion of its length, at its opposite end, each bolt is angular, preferably square, in cross section, and passes through and is seated in a correspondingly shaped recess or slot in the periphery of the collar H and an extension 10 thereof. On the extension 10, a screw thread is cut which is engaged by the internal thread on a collar or nut 11, and in the outer side of each adjusting bolt is milled a slot or notch 12, into which the inner portion of the collar or nut 11 projects, so that, upon the rotation of the nut 11 to the right or to the left, the bolts I, by reason of the engagement of the sides of the collar or nut with the ends of the slots or recesses 12, will be moved longitudinally, in a direction corresponding to the direction of rotation of the nut, and thus the clutch be adjusted.

It will be evident that by my present construction, all the bolts I are acted upon simultaneously and equally, so that any disturbance of the parallelism of the friction surfaces of the clutch is impossible, and it only becomes of importance that it be seen that when the clutch parts are originally assembled, they are assembled correctly, for if this be seen to, there can be no derangement of the proper relation of the contacting friction surfaces when they are moved for purposes of adjustment. Moreover, as all the bolts are acted upon simultaneously, the adjustment can be effected more quickly than is the case where each bolt must be separately adjusted, and as there are fewer parts in my present device, the work of original assemblage can be done more quickly.

For the convenient rotation of the adjusting nut, it is provided with several radial holes 14, for the application of a spanner wrench, and in order to lock it when adjusted to the desired point, a set screw 15 is provided that extends radially inward and at its inner end impinges upon the collar extension.

Although I have developed my present invention in connection with my clutch forming the subject of Patent No. 835,373, and illustrate and describe such clutch herein, it is to be understood that I do not confine my improvements to use with a clutch of the particular construction referred to.

What I claim is—

1. In a clutch, the combination of co-acting surfaces, including a movable jaw, a collar, a series of bolts rigidly connected to the jaw and slidably connected with the collar, and means for equally moving all the bolts longitudinally, comprising a rotary and axially movable ring concentric with the series of bolts and directly engaging all the bolts.

2. In a clutch, the combination of co-acting surfaces, including a movable jaw, a collar, a series of bolts connected to the jaw, and slidably connected with the collar, said collar being provided with screw threads, and a threaded ring or nut engaging the collar threads and engaging all the bolts so as to move them longitudinally by its rotation.

3. In a clutch, the combination of co-acting surfaces, including a movable jaw, a series of bolts connected to said jaw, a collar having openings through which the bolts are slidably movable, and a rotatable adjusting device mounted on the collar and engaging all the bolts.

4. In a clutch, the combination of co-acting surfaces, including a movable jaw, a series of bolts connected to said jaw, a collar having openings through which the bolts are slidably movable, a rotatable adjusting device mounted on the collar and engaging all the bolts, and means to lock said collar against rotation.

5. In a clutch, the combination of co-acting surfaces, including a movable jaw, a series of bolts connected to said jaw, a collar having slots in its periphery, in which the bolts are slidably seated, and a rotatable adjusting ring mounted on said collar and projecting into a notch or recess in each bolt.

6. In a clutch, the combination of co-acting surfaces, including a movable jaw, a series of bolts rigidly clamped to said jaw, a shaft-encircling collar having recesses, angular in cross section, engaged by correspondingly shaped portions of the bolts, in which the bolts are slidably movable, and an adjusting ring having a threaded engagement with said collar and engaging all said bolts.

7. In a clutch, the combination of a friction ring, concentrically arranged jaws on opposite sides of said ring, a shaft-encircling collar, and connections between said collar and said jaws, the connections between the collar and one jaw consisting of a series of bolts rigidly secured to the jaw and slidably fitted in openings in the collar, and an adjusting ring having a threaded engagement with the collar and projecting into recesses or notches in all the bolts.

In testimony that I claim the foregoing, I have hereunto set my hand.

HOWARD ROY STACKS.

Witnesses:
  JOSEPH M. HEWLETT,
  D. J. HUNTER, Jr.